(12) United States Patent
Aono

(10) Patent No.: US 6,351,798 B1
(45) Date of Patent: Feb. 26, 2002

(54) ADDRESS RESOLUTION UNIT AND ADDRESS RESOLUTION METHOD FOR A MULTIPROCESSOR SYSTEM

(75) Inventor: Fumio Aono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/333,051

(22) Filed: Jun. 15, 1999

(30) Foreign Application Priority Data

Jun. 15, 1998 (JP) ............................................ 10-166723

(51) Int. Cl.[7] ...................... G06F 15/16; G06F 15/173; G06F 12/10

(52) U.S. Cl. .............................. 712/11; 712/14; 712/17; 712/18; 712/30; 712/244; 711/210; 711/206; 709/248; 709/249

(58) Field of Search .............................. 709/251.7, 252, 709/314, 313, 215, 219, 230, 213, 249, 238, 216; 711/145, 144, 214, 163, 221, 216, 210, 206; 714/12, 27; 712/10, 12, 13, 14, 15, 16, 17, 23, 28, 29, 36, 11, 20, 18, 30, 31; 710/40, 39, 129, 200, 240, 220, 244, 23

(56) References Cited

U.S. PATENT DOCUMENTS 4,694,396 A * 9/1987 Weisshaar et al. .......... 709/313
5,574,849 A * 11/1996 Sonnier et al. ............... 714/12

FOREIGN PATENT DOCUMENTS

| JP | 62-67665  | 3/1987 |
| JP | 3-132845  | 6/1991 |
| JP | 9-146903  | 6/1997 |
| JP | 9-179771  | 7/1997 |

OTHER PUBLICATIONS

Japanese Office Action dated Oct. 31, 2000 with partial translation.

* cited by examiner

Primary Examiner—Daniel H. Pan
(74) Attorney, Agent, or Firm—McGinn & Gibb, PLLC

(57) ABSTRACT

The present invention provides an address resolution method for use in a multiprocessor system with distributed shared memory. The method allows users to change a memory configuration and a system configuration to increase system operation flexibility and to isolate errors. A cell controller indexes into an address resolution table using the high-order part of a processor-specified address. A write protection flag specifies whether to permit write access from other cells. An attempt to write-access a cell inhibited for write access causes a logical circuit to output an access exception signal.

9 Claims, 11 Drawing Sheets

| | | | | | | | | | | | | | | | | |
|---|---|---|---|---|---|---|---|---|---|---|---|---|---|---|---|---|
| 0 | 1 | 0 | 0 | 0 | 1 | 1 | 0 | 0 | 1 | 2 | 0 | 0 | 1 | 3 | 0 |
| 1 | 1 | 0 | 1 | 1 | 1 | 1 | 1 | 1 | 1 | 2 | 1 | 1 | 1 | 3 | 1 |
| 2 | 1 | 0 | 2 | 2 | 1 | 1 | 2 | 2 | 1 | 2 | 2 | 2 | 1 | 3 | 2 |
| 3 | 1 | 0 | 3 | 3 | 1 | 0 | 3 | 3 | 1 | 0 | 3 | 3 | 1 | 0 | 3 |
| 4 | 1 | 1 | 3 | 4 | 1 | 1 | 3 | 4 | 1 | 1 | 3 | 4 | 1 | 1 | 3 |
| 5 | 1 | 2 | 3 | 5 | 1 | 2 | 3 | 5 | 1 | 2 | 3 | 5 | 1 | 2 | 3 |
| 6 | 1 | 3 | 3 | 6 | 1 | 3 | 3 | 6 | 1 | 3 | 3 | 6 | 1 | 3 | 3 |
| 7 | 0 | - | - | 7 | 0 | - | - | 7 | 0 | - | - | 7 | 0 | - | - |
| 8 | 0 | - | - | 8 | 0 | - | - | 8 | 0 | - | - | 8 | 0 | - | - |
| 9 | 0 | - | - | 9 | 0 | - | - | 9 | 0 | - | - | 9 | 0 | - | - |
| A | 0 | - | - | A | 0 | - | - | A | 0 | - | - | A | 0 | - | - |
| B | 0 | - | - | B | 0 | - | - | B | 0 | - | - | B | 0 | - | - |
| C | 0 | - | - | C | 0 | - | - | C | 0 | - | - | C | 0 | - | - |
| D | 0 | - | - | D | 0 | - | - | D | 0 | - | - | D | 0 | - | - |
| E | 0 | - | - | E | 0 | - | - | E | 0 | - | - | E | 0 | - | - |
| F | 0 | - | - | F | 0 | - | - | F | 0 | - | - | F | 0 | - | - |
| NODE#0 | | | | NODE#1 | | | | NODE#2 | | | | NODE#3 | | | |

FIG. 4

| | CELL$0 | | | | CELL$1 | | | | CELL$2 | | | | CELL$3 | | |
|---|---|---|---|---|---|---|---|---|---|---|---|---|---|---|---|
| 0 | 1 | 0 | 0 | 0 | 1 | 0 | 0 | 0 | 1 | 2 | 0 | 0 | 1 | 3 | 0 |
| 1 | 1 | 0 | 1 | 1 | 1 | 0 | 1 | 1 | 1 | 2 | 1 | 1 | 1 | 3 | 1 |
| 2 | 1 | 0 | 2 | 2 | 1 | 0 | 2 | 2 | 1 | 2 | 2 | 2 | 1 | 3 | 2 |
| 3 | 1 | 0 | 3 | 3 | 1 | 0 | 3 | 3 | 0 | - | - | 3 | 0 | - | - |
| 4 | 1 | 1 | 0 | 4 | 1 | 1 | 0 | 4 | 0 | - | - | 4 | 0 | - | - |
| 5 | 1 | 1 | 1 | 5 | 1 | 1 | 1 | 5 | 0 | - | - | 5 | 0 | - | - |
| 6 | 1 | 1 | 2 | 6 | 1 | 1 | 2 | 6 | 0 | - | - | 6 | 0 | - | - |
| 7 | 1 | 1 | 3 | 7 | 1 | 1 | 3 | 7 | 1 | 1 | 3 | 7 | 1 | 1 | 3 |
| 8 | 1 | 2 | 3 | 8 | 1 | 2 | 3 | 8 | 1 | 2 | 3 | 8 | 1 | 2 | 3 |
| 9 | 1 | 3 | 3 | 9 | 1 | 3 | 3 | 9 | 1 | 3 | 3 | 9 | 1 | 3 | 3 |
| A | 0 | - | - | A | 0 | - | - | A | 0 | - | - | A | 0 | - | - |
| B | 0 | - | - | B | 0 | - | - | B | 0 | - | - | B | 0 | - | - |
| C | 0 | - | - | C | 0 | - | - | C | 0 | - | - | C | 0 | - | - |
| D | 0 | - | - | D | 0 | - | - | D | 0 | - | - | D | 0 | - | - |
| E | 0 | - | - | E | 0 | - | - | E | 0 | - | - | E | 0 | - | - |
| F | 0 | - | - | F | 0 | - | - | F | 0 | - | - | F | 0 | - | - |

NODE#0 (CELL$0, CELL$1)     NODE#2 (CELL$2)     NODE#3 (CELL$3)

FIG. 6

| | NODE#0 | | | NODE#1 | | | NODE#2 | | | NODE#3 | | |
|---|---|---|---|---|---|---|---|---|---|---|---|---|
| 0 | 1 | 0 | 0 | 1 | 1 | 0 | 1 | 2 | 0 | 1 | 3 | 0 |
| 1 | 1 | 0 | 1 | 1 | 1 | 1 | 1 | 2 | 1 | 1 | 3 | 1 |
| 2 | 1 | 0 | 2 | 1 | 1 | 2 | 1 | 2 | 2 | 1 | 3 | 2 |
| 3 | 0 | - | - | 1 | 1 | 3 | 1 | 2 | 3 | 1 | 3 | 3 |
| 4 | 1 | 0 | 3 | 1 | 0 | 3 | 1 | 0 | 3 | 1 | 0 | 3 |
| 5 | 0 | - | - | 0 | - | - | 0 | - | - | 0 | - | - |
| 6 | 0 | - | - | 0 | - | - | 0 | - | - | 0 | - | - |
| 7 | 0 | - | - | 0 | - | - | 0 | - | - | 0 | - | - |
| 8 | 0 | - | - | 0 | - | - | 0 | - | - | 0 | - | - |
| 9 | 0 | - | - | 0 | - | - | 0 | - | - | 0 | - | - |
| A | 0 | - | - | 0 | - | - | 0 | - | - | 0 | - | - |
| B | 0 | - | - | 0 | - | - | 0 | - | - | 0 | - | - |
| C | 0 | - | - | 0 | - | - | 0 | - | - | 0 | - | - |
| D | 0 | - | - | 0 | - | - | 0 | - | - | 0 | - | - |
| E | 0 | - | - | 0 | - | - | 0 | - | - | 0 | - | - |
| F | 0 | - | - | 0 | - | - | 0 | - | - | 0 | - | - |

FIG. 8

| | NODE#0 | | | NODE#1 | | | NODE#2 | | | NODE#3 | | |
|---|---|---|---|---|---|---|---|---|---|---|---|---|
| 0 | 1 | 0 | 0 | 1 | 0 | 0 | 1 | 0 | 0 | 1 | 0 | 0 |
| 1 | 1 | 0 | 1 | 1 | 0 | 1 | 1 | 0 | 1 | 1 | 0 | 1 |
| 2 | 1 | 0 | 2 | 1 | 0 | 2 | 1 | 0 | 2 | 1 | 0 | 2 |
| 3 | 1 | 0 | 3 | 1 | 0 | 3 | 1 | 0 | 3 | 1 | 0 | 3 |
| 4 | 1 | 1 | 0 | 1 | 1 | 0 | 1 | 1 | 0 | 1 | 1 | 0 |
| 5 | 1 | 1 | 1 | 1 | 1 | 1 | 1 | 1 | 1 | 1 | 1 | 1 |
| 6 | 1 | 1 | 2 | 1 | 1 | 2 | 1 | 1 | 2 | 1 | 1 | 2 |
| 7 | 1 | 1 | 3 | 1 | 1 | 3 | 1 | 1 | 3 | 1 | 1 | 3 |
| 8 | 1 | 2 | 0 | 1 | 2 | 0 | 1 | 2 | 0 | 1 | 2 | 0 |
| 9 | 1 | 2 | 1 | 1 | 2 | 1 | 1 | 2 | 1 | 1 | 2 | 1 |
| A | 1 | 2 | 2 | 1 | 2 | 2 | 1 | 2 | 2 | 1 | 2 | 2 |
| B | 1 | 2 | 3 | 1 | 2 | 3 | 1 | 2 | 3 | 1 | 2 | 3 |
| C | 1 | 3 | 0 | 1 | 3 | 0 | 1 | 3 | 0 | 1 | 3 | 0 |
| D | 1 | 3 | 1 | 1 | 3 | 1 | 1 | 3 | 1 | 1 | 3 | 1 |
| E | 1 | 3 | 2 | 1 | 3 | 2 | 1 | 3 | 2 | 1 | 3 | 2 |
| F | 1 | 3 | 3 | 1 | 3 | 3 | 1 | 3 | 3 | 1 | 3 | 3 |

FIG. 10

ADDRESS RESOLUTION UNIT AND ADDRESS RESOLUTION METHOD FOR A MULTIPROCESSOR SYSTEM

BACKGROUND OF THE INVENTION

The present invention relates to a multiprocessor system and address resolution method therefor, and more particularly to a multiprocessor system featuring the distributed shared memory architecture and to address resolution method therefor.

Compared with a system where all memory is provided in one location, a system featuring the distributed shared architecture which distributes memory among multiple processors gives the user fast access to local memory. However, when multiple memories located at different locations are organized into one memory space in the distributed shared memory configuration, it is necessary to check whether a requested access is to a local memory or to a remote memory and, when the access request is to a remote memory, it must be transferred to the requested remote memory. This requires some means for resolving addresses (e.g., an address translation table).

A system with a typical distributed shared memory configuration usually has a plurality of configuration units (hereinafter called "cells"), each having computer's main components such as processors and memories, interconnected with each other to form a large system. In this case, it is relatively easy to separate each cell and run it as an independent computer. This separation is called "partitioning", and a separated cell is called "a partition" or "domain". This configuration gives an advantage over a centralized memory system in that a large system can be built easily.

On the other hand, in a large symmetric multiprocessor computer in which multiple processors share memory, there are software constraints and resource competitions that make it difficult to increase performance in proportion to the number of processors (scalability). There is also a physical limitation on the number of processors that can be added. To cope with these problems, multiple computers are sometimes interconnected to build a system which provides large processing power. A system like this is called "a cluster system", and the independent computers constituting the cluster system are called "nodes". The cluster system allows the user to build a system of any size and, in addition, ensures availability. That is, in many cases, the cluster system having multiple computers, each operating independently, prevents an error or a crash generated in one location of the system from affecting the whole system. For this reason, the cluster system is sometimes used to build a system which requires high reliability.

The problems with the cluster system described above is that the setup and the management of the system is more complex than a single computer of the same size and that the cabinets and cables require additional costs. To solve these problems, an "in-box" cluster system is on the market today. In this system, multiple already-interconnected small computers are installed in one cabinet and the setup and test are made before shipping. However, conventional cluster systems, including the "in-box" cluster system, use a network for computer interconnection. This results in a large communication overhead, sometimes preventing performance from increasing as more nodes are added.

On the other hand, added processors do not always increase the performance of a large single computer depending upon the processing it performs. In addition, an error or a failure, once caused in a large single computer, sometimes affects the whole system.

SUMMARY OF THE INVENTION

The present invention seeks to solve the problems associated with the prior art described above. It is an object of the present invention to provide a computer system, featuring the distributed shared memory architecture, which selectively acts as a single symmetric multiprocessor computer system or as an "in-box" cluster system. The computer with this configuration solves the problems with, and takes advantage of, the symmetric computer system and the "in-box" cluster system depending upon processing to be performed.

According to one aspect of the present invention, there is provided a multiprocessor system having a plurality of cells each including at least one processor and at least one memory, wherein the multiprocessor system determines a cell including the memory indicated by a specified address and inhibits a write request if destination of the request is some other cell.

BRIEF DESCRIPTION OF THE DRAWINGS

An embodiment of the present invention can be better understood with reference to the text and to the following drawings, as follows:

FIG. 4 is a diagram showing an example of the address resolution table used to implement the first example of memory configuration according to the present invention;

FIG. 6 is a diagram showing an example of the address resolution table used to implement the second example of memory configuration according to the present invention;

FIG. 8 is a diagram showing an example of the address resolution table used to implement the third example of memory configuration according to the present invention;

FIG. 10 is a diagram showing an example of the address resolution table used to implement the fourth example of memory configuration according to the present invention.

DESCRIPTION OF THE PREFERRED EMBODIMENTS

An embodiment of the present invention will be described in detail by referring to the attached drawings.

Figure 1:
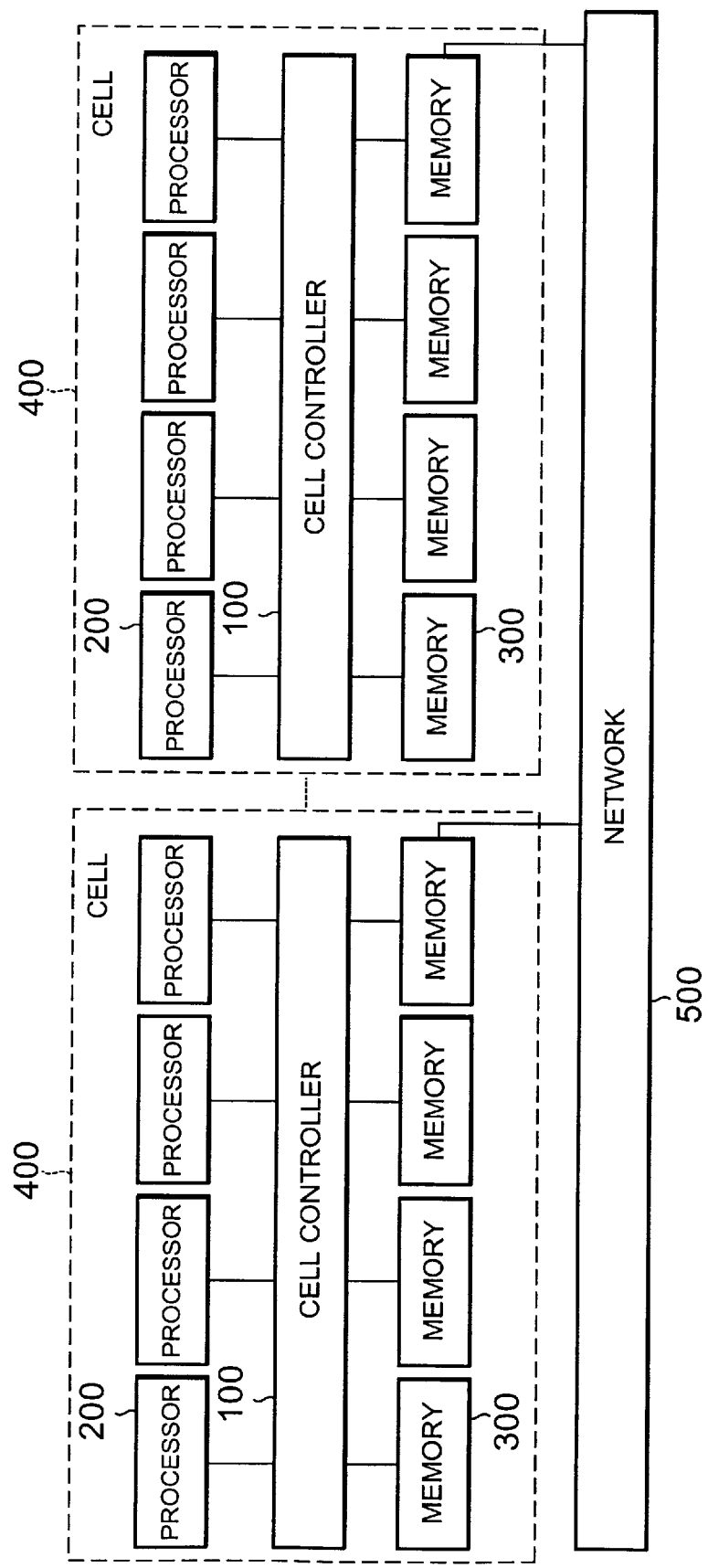
FIG. 1 is a block diagram showing the configuration of a multiprocessor system used in an embodiment of the present invention.

Referring to FIG. 1, the embodiment of a multiprocessor system according to the present invention comprises a plurality of cells 400 interconnected by a network 500. In the following description, assume that the system has four cells 400 each with four processor 200, four memories 300, and one cell controller 100. These may be set up according to the system requirements.

The memories 300 are distributed among the cells 400. From each processor 200, the distance to a memory in its own cell differs from the distance to a memory in some other cell. The time to access a memory in its own cell also differs the time to access a memory in some other cell. From the physical aspect, this configuration is "a distributed shared memory architecture"; from the time aspect, it is called "an non-uniform memory access (NUMA) architecture". On the other hand, even in the distributed shared memory configuration, all memories may be logically combined into one large space for processing by software. In this case, from a software point of view, the memories are allocated as if they were equal in distance to all processors. That is, the system may be configured so that any processor views the system the same way. In this sense, a system with this topology is thought of as one aspect of a symmetric multi-processing computer.

A data processing system with this configuration allows the user to use the system as one symmetric multiprocessor computer and, with some additional units, as a plurality of small computers.

Figure 2:
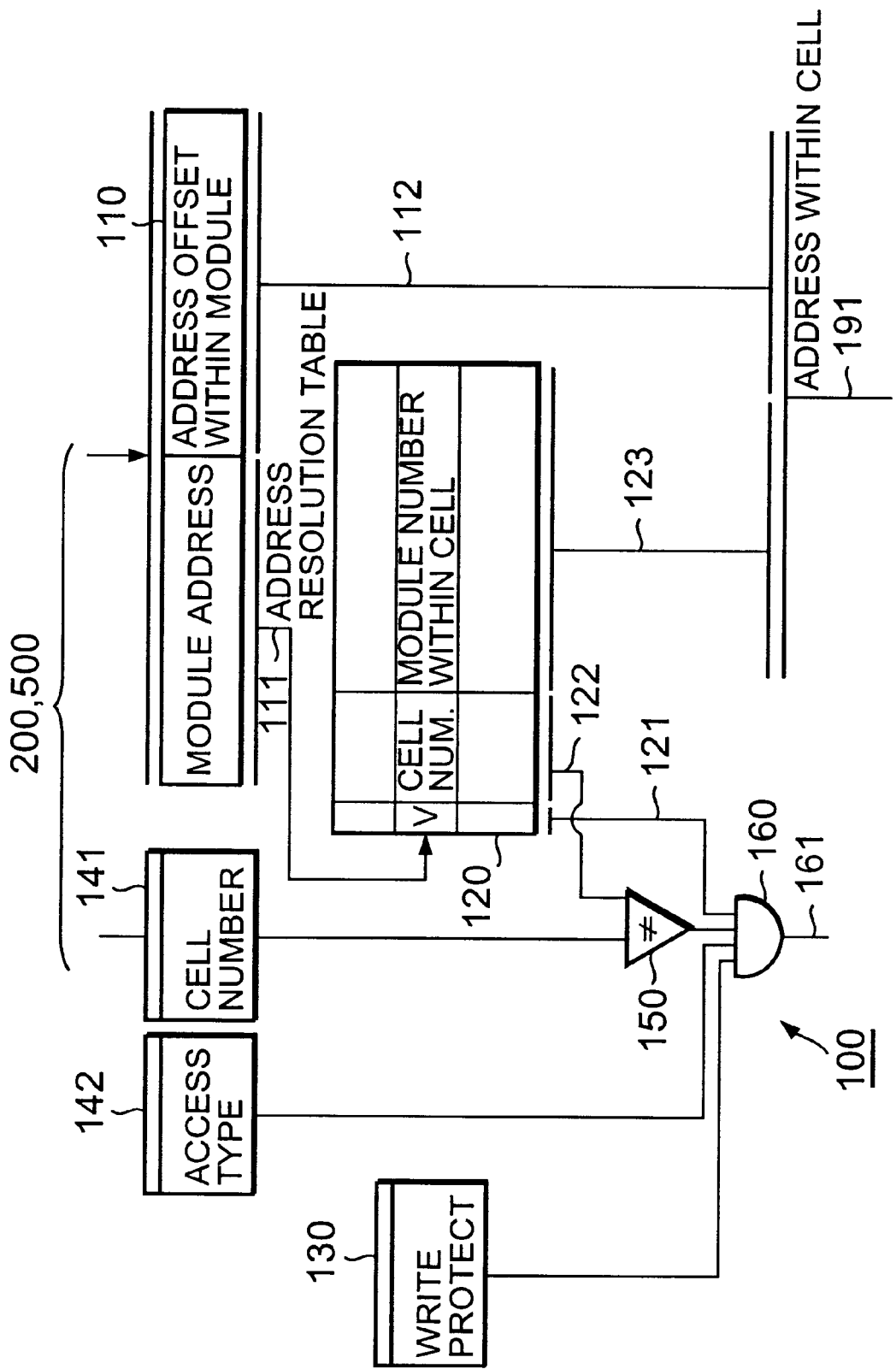
FIG. 2 is a diagram showing the configuration of a cell controller used in the embodiment of the present invention.

Referring to FIG. 2, the cell controller 100 in each cell comprises an address register 110, an address resolution table 120, a write protection flag 130, a cell number register 141, an access type register 142, a comparator 150, and a logical AND circuit 160.

The address resolution table 120 is initialized at system startup time. The memories 300 distributed among the cells are configured as one non-overlapping memory space through the address resolution table 120. When the processor 200 requests a memory address, the cell controller 100 indexes the address resolution table 120 for the physical cell to be accessed. The address resolution table 120, composed of a plurality of entries, is indexed by a module address 111 of the address sent from the processor 200 or the network 500 and stored in the address register 110. Each entry of the address resolution table 120 comprises a validity bit 121, a cell number 122, and a module number within the cell 123. The validity bit 121 indicates whether or not the entry is valid. For example, the value of "0" indicates that the entry is not valid, and the value of "1" indicates that the entry is valid. The cell number 122 indicates the number of the cell in which the memory module corresponding to the address is included. The cell number may be a number physically assigned within the system or a number logically assigned with the cell as the relative address of "0". Therefore, "the same cell numbers" mean that the cells are substantially the same, not in expression. The module number within the cell 123 indicates the number of the module of the memory 300 within the cell corresponding to the address. The module number within the cell 123 and an address offset within the module 112 are combined into an address within the cell 191.

The write protection flag 130 indicates whether or not a write request from other cells is permitted. For example, the value of "0" permits a write from other cells; the value of "1" inhibits a write from other cells and generates an access exception.

The cell number register 141 contains the number of the cell in which the processor 200 sending an access request is included. The access type register 142 contains a value indicating the type of the access request. For example, the value of "1" indicates write access. The comparator 150 compares the contents of the cell number register 141 with the cell number 122 read from the address resolution table 120. The logical AND circuit 160 generates an access exception generation signal 161 when the validity bit 121 of the address resolution table 120 indicates that the entry is "valid", when the access type is "write", when the write protection flag 130 indicates that a write is "inhibited", and when the cell number 122 read from the address resolution table 120 does "not match" the value in the cell number register 141. This signal 161 ensures node independence in the cluster configuration and prevents error propagation.

Next, the operation of the embodiment according to the present invention will be described with reference to the drawings.

Figure 3:
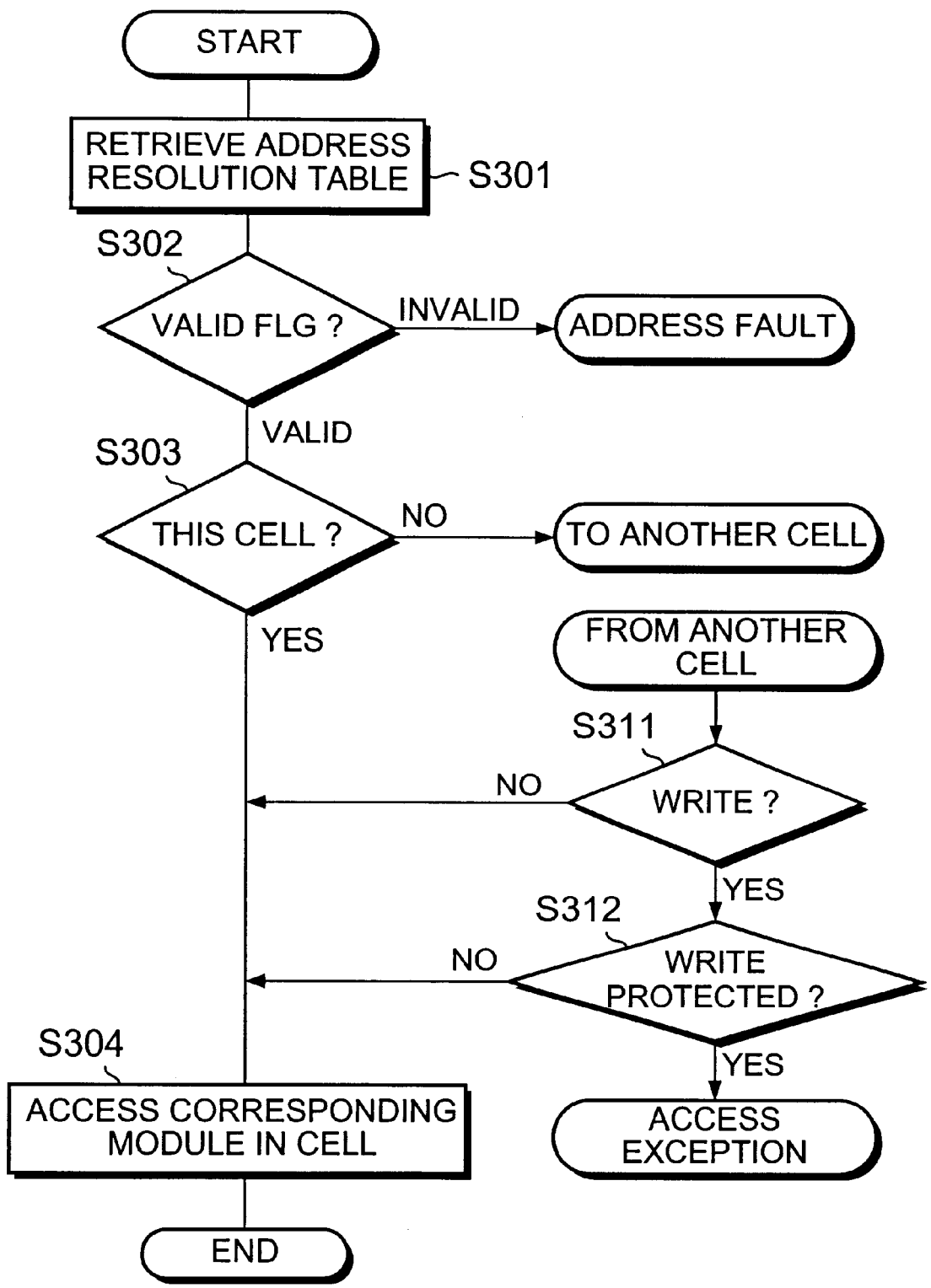
FIG. 3 is a flowchart showing the operation of the embodiment of the present invention.

Referring to FIGS. 1 to 3, when the processor 200 issues a memory access request, the cell controller 100 indexes the address resolution table 120 using the module address 111 (step S301). If the validity bit 121 indicates that the entry is "invalid" (step S302), the circuit generates an address fault assuming that the access request was issued to a non-existing address. If the memory address is found an address in some other cell (step S303), the circuit accesses that cell via the network 500. If the memory address is in its own cell, the circuit accesses the corresponding module in the cell (step S304). If an access request is received from some other cell and if it is not a "write" request (step S311), the circuit accesses the corresponding memory module in the same way the circuit accesses the memory module in response to an access request generated within its own cell (step S304). On the other hand, if an access request received from some other cell is a "write" request, the circuit checks the write protection flag 130 (step S312). If the rite protection flag 130 indicates that a write from some other cell is "permitted", the circuit accesses the corresponding module (step S304); if the write protection flag 130 indicates that a write from some other cell is "inhibited", the circuit generates an access exception.

Some examples of the memory configuration of the embodiment according to the present invention will now be described.

Figure 5:
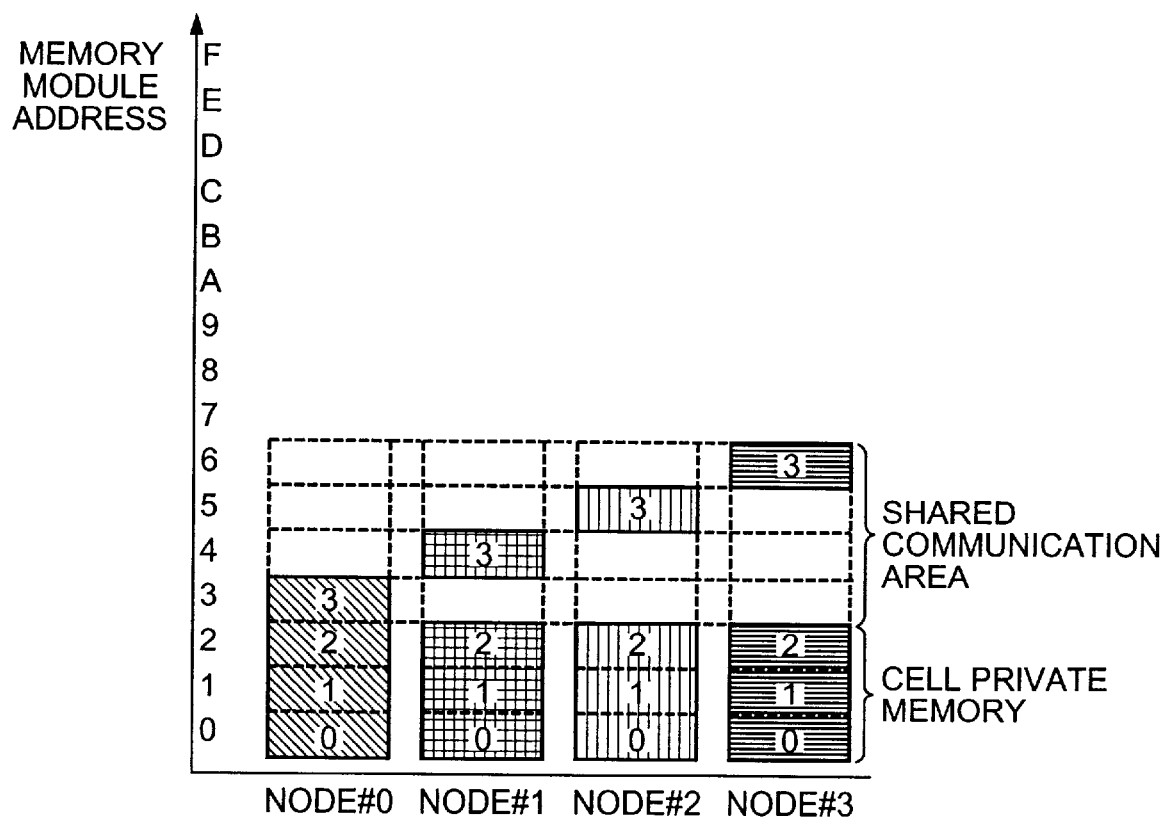
FIG. 5 is a diagram showing the memory map of the first example of memory configuration according to the present invention.

When the address resolution tables 120 of nodes #0 to #3 are set up as shown in FIG. 4, the memory configuration is as shown in FIG. 5. In FIG. 5, the solid line areas are memories physically installed on each node. Although it is assumed in this example that all nodes has the same amount of memory, they need not have the same amount of memory in an actual system. The vertical axis indicates the memory module addresses with the address space starting with address "0" in each node. Address "0" is at the top of FIG. 4, while address "0" is at the bottom in FIG. 5.

In this memory configuration example, module address-ees x0 to x2 of each node, which are mapped to the private memory of the node, are independent with each other (cell private memory). On the other hand, module addresses x3 to x6 are set up so that they are unique across cells to allow them to be accessed from any node using common addresses (shared communication area). In this example, the shared area is more than the half of the logical address space of each node. This is because each cell has four memory modules for convenience. In an actual configuration, the ratio of the shared area to the private area may be smaller.

Figure 7:
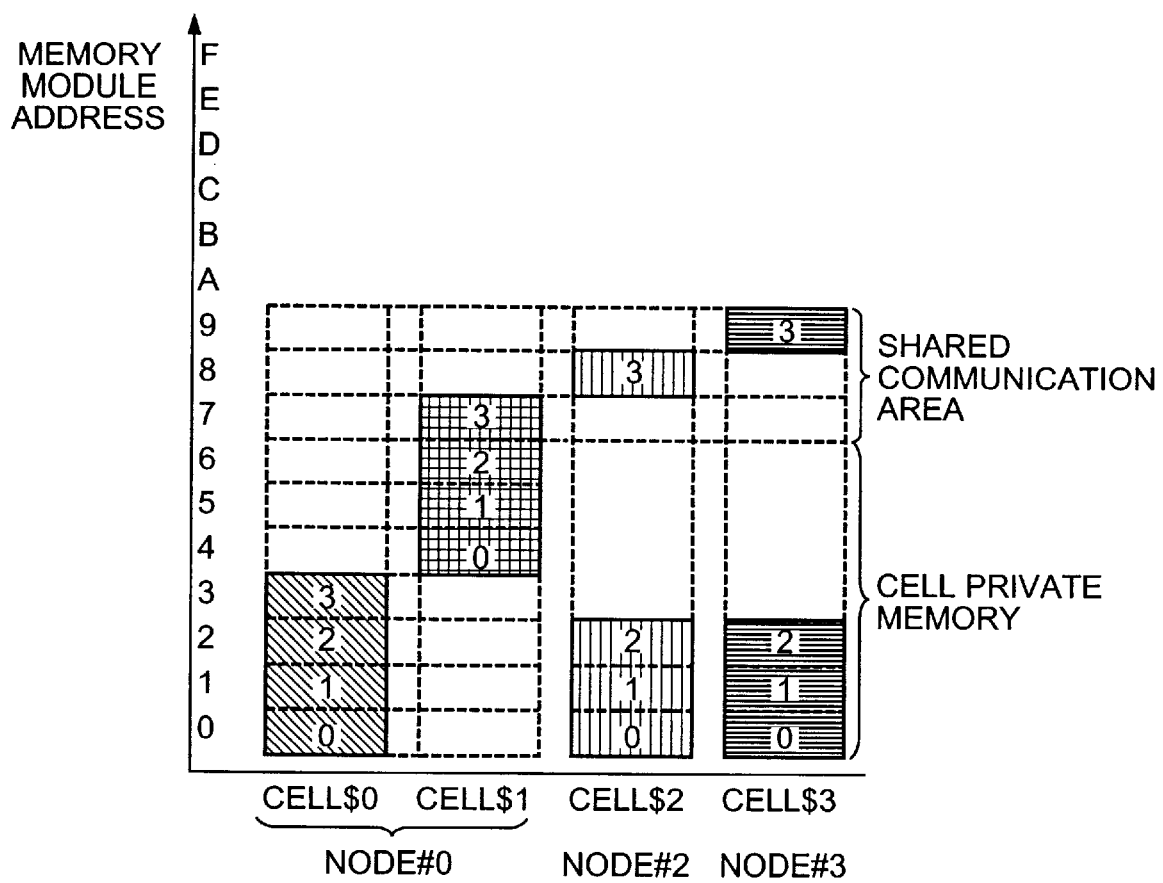
FIG. 7 is a diagram showing the memory map of the second example of memory configuration according to the present invention.

When the address resolution tables 120 of nodes 190 0 to #3 are set up as shown in FIG. 6, the memory configuration is as shown in FIG. 7. In the example shown in FIG. 7, cell $0 and cell $1 constitute a computer with the symmetric multiprocessor configuration. These two cells form one node. The cluster system is therefore comprises three nodes: node #0 (cell #0 and cell $1), node #2 (cell $2), and node #3 (cell $3). In node #0, a total of seven modules, that is, all physical memory modules of cell #0 and memory modules x0 to x2 of cell $1, are set up as private memory for common use by cell $0 and cell $1. Module x3 of cell $1 is shared among the nodes as cluster shared memory (communication area). The memory maps of cell $2 and cell $3 are substantially the same as those shown in FIG. 5 with the exception that the addresses of the memory modules set up as shared memory are different from those in FIG. 5.

In the setup shown in FIG. 6, the write protection flag 130 is used to specify whether to permit write access from other cells. That is, write access in the same node is permitted even if the access is across cells. Therefore, for a memory setup where two or more cells are in the same node, write access from a particular cell (a cell in the same node) must be permitted.

Figure 9:
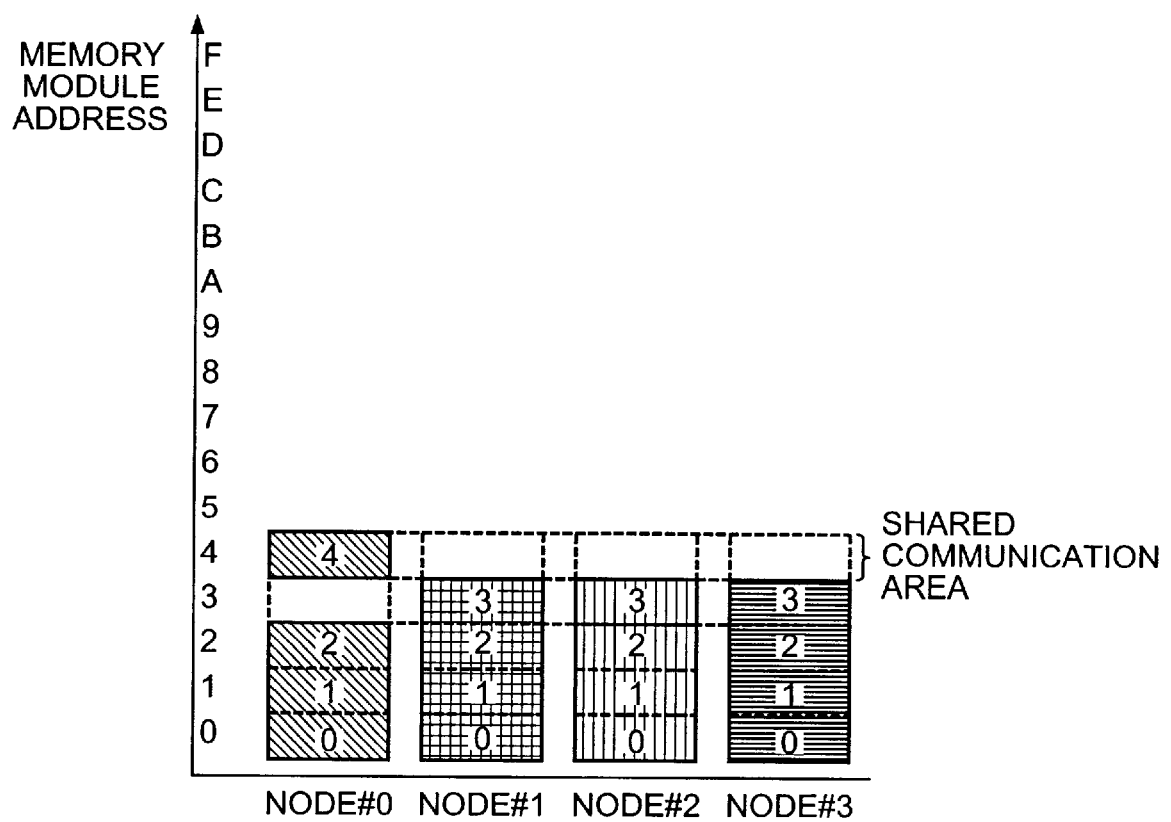
FIG. 9 is a diagram showing the memory map of the third example of memory configuration according to the present invention.

When the address resolution tables 120 of nodes #0 to #3 are set up as shown in FIG. 8, the memory configuration is as shown in FIG. 9. In this configuration, only one memory module in one particular node is shared among nodes. Note that, in this configuration, the write protection flag 130 of that memory module must be write-permission. This allows all nodes to write into that particular memory module in node #0, making available the memory module as communication means. The problem with this configuration is that an error, if generated in node #0, may inhibits node-to-node communication, sometimes forcing the system to go down. Therefore, this configuration should be selected with the memory size and the communication amount in mind.

Figure 11:
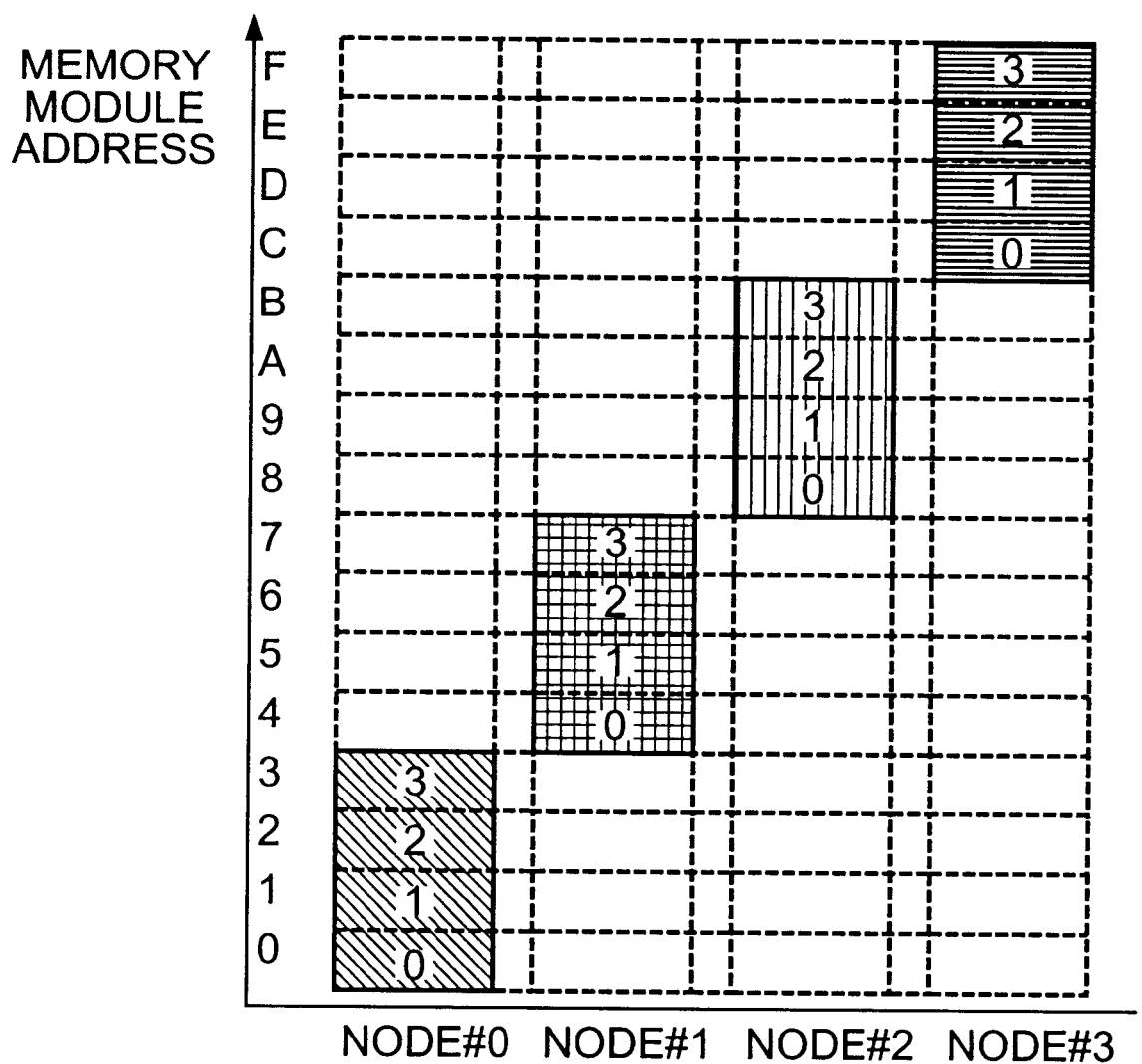
FIG. 11 is a diagram showing the memory map of the fourth example of memory configuration according to the present invention.

When the address resolution tables 120 of nodes #0 to #3 are set up as shown in FIG. 10, the memory configuration is as shown in FIG. 11. This memory configuration is the one used for a symmetric multiprocessor. The memory modules of the nodes are re-configured sequentially, beginning with memory module x0 of node #0, into one contiguous address space composed of 16 memory modules. In this configuration; all nodes can access all memory modules.

In the above description, the address translation table 120 is used as an example of address resolution means. Out of the information stored in the address translation table 120, only the routing information is required for forwarding access requests from one cell to another. Thus, other information such as the one required for identifying a location a destination cell need not always be stored in the address translation table; such information may be stored, for example, at a location within the destination cell.

The embodiment of the present invention has the address resolution table 120 which determines in which cell a requested address is included. In addition, the write protection flag 130 is provided to specify whether or not a write request from other cells is permitted. These allow various memory configurations to be implemented in a multiprocessing system and, at the same time, prevents an error in one cell from affecting other cells.

As described above, the method according to the present invention determines in which cell an address to be accessed is included and, at the same time, controls write access from one cell to another. Therefore, this method allows the user to build various memory configurations for flexible multiprocessor system operation, ensures cell independence, and prevents an error generated in one cell from affecting other cells.

What is claimed is:

1. A multiprocessor system having a plurality of cells each including at least one processor, at least one memory module, and a cell controller connecting said at least one processor and said at least one memory module, wherein said cell controller comprises:

an address resolution table having at least one entry corresponding to said at least one memory module, each of said at least one entry holding a number of the cell where the corresponding memory module exists;

means for searching said address resolution table using a requested address and, when the cell where the memory module associated with the requested address is located is some other cell, for accessing the other cell;

a write protection flag indicating whether or not a write access request from other cells is permitted; and means for detecting an access exception when an access request from some other cell is the write access request and when said write protection flag indicates that the write access request from the other cells is inhibited.

2. The multiprocessor system according to claim 1, wherein each entry of said address resolution table further holds a module number within cell of the corresponding memory module, and wherein the memory module included in said cell is identified by said module number within the cell.

3. The multiprocessor system according to claim 1, wherein at least one entry of said address resolution table includes, as the number of the cell where the memory module associated with the address exists, the number of the cell where said address resolution table is not included.

4. The multiprocessor system according to claim 3, wherein said write protection flag is set up to inhibit the write access request from other cells.

5. The multiprocessor system according to claim 4, wherein the write access request from one particular cell is permitted regardless of the setup of said write protection flag.

6. The multiprocessor system according to claim 1, wherein said address resolution tables of at least two cells have the same cell number in at least one pair of corresponding entries.

7. The multiprocessor system according to claim 1, wherein said address tables of all cells have the same cell number in all corresponding pairs of entries.

8. A cell controller in a multiprocessor system having a plurality of cells each including at least one processor, at least one memory module, and the cell controller connecting said at least one processor and said at least one memory module, said cell controller comprising:

an address resolution table composed of a plurality of entries each of which includes a number of the cell where the memory module associated with an address exists;

means for searching said address resolution table using a requested address and, when the cell where the memory module associated with the requested address is located is some other cell, for accessing the other cell;

a write protection flag indicating whether or not a write access request from other cells is permitted; and means for detecting an access exception when an access request from some other cell is the write access request and when said write protection flag indicates that the write access request from the other cells is inhibited.

9. The cell controller according to claim 8, wherein each entry of said address resolution table further includes an identification number of the memory module within the cell, said memory module associated with the address, and wherein the memory module included in said cell is identified by said identification number within the cell.

* * * * *